United States Patent

[11] 3,542,384

[72] Inventor  Kenneth O. Speed
              7021 Beechfield Drive, Palos Verdes
              Peninsula, California 90274
[21] Appl. No. 746,604
[22] Filed     July 22, 1968
[45] Patented  Nov. 24, 1970

[54] COLLET STOP
     7 Claims, 3 Drawing Figs.
[52] U.S. Cl. .................................................. 279/46,
                                                          287/109
[51] Int. Cl. .................................................. B23b 13/12
[50] Field of Search ........................................ 279/1(S),
                                                       46; 287/109

[56]                References Cited
              UNITED STATES PATENTS
1,776,615   9/1930   Boothman ..................   287/109
2,469,160   5/1949   Evans .........................    279/1

2,771,297  11/1956   Nipken .........................   279/1

Primary Examiner—Robert C. Riordon
Assistant Examiner—Donald D. Evenson
Attorney—Edward D. O'Brian ABSTRACT: A collet stop is disclosed. This stop includes an elongated housing having opposed first and second ends. A cavity extends into the housing from the first end. A rod is threaded through a bore in the second end of the housing so as to extend from the exterior of this second end into the cavity towards the first end. The exterior of the housing adjacent to the first end is provided with a tapered, stepped surface having its smallest end adjacent to the first end of the housing. This surface is composed of a plurality of narrow cylindrical sections joined to adjacent sections by shoulders. The base of a collet is adapted to be secured to this surface by being pressed over a correspondingly dimensioned one of these sections against one of these shoulders.

Kenneth O. Speed
INVENTOR.

BY Edward D. O'Brian
ATTORNEY.

COLLET STOP

BACKGROUND OF THE INVENTION

The term "collet" 15 is commonly used to designate a type of holder employed with lathes, automatic screw machines and the like. Such a collect normally includes a cylindrical base supporting a plurality of holding jaws or fingers, the exterior surfaces of which are tapered outwardly from the general area of the base of the collet. With such a collet when an object such as a work piece is located between the jaws so as to extend into the interior of the collet it may be secured in place by the jaws or fingers being deflected slightly towards the center of the collet.

During the use of such collets, it is frequently desired to utilize a stop mechanism which will limit the amount or distance that a work piece or other object may be inserted between the jaws or fingers of the collet. A number of different such stop devices have been developed prior to the present invention. An understanding of this invention does not require a detailed knowledge or understanding of such prior devices. It is considered that, in general, they have all intended to be comparatively limited in their acceptability because of any of a plurality of different reasons.

Certain of these prior collet stops have been of such a nature that they could only be used with collets of a particular size or of a particular construction. Obviously this is disadvantageous since a machinist will normally desire to use a collet stop with differently sized collets. On occasion, these prior related devices have been considered to be relatively difficult to use. Certain of these prior collet stops are considered to have been more expensive than economically desirable.

SUMMARY OF THE INVENTION

An object of the present invention is to provide new and improved collet stops which overcome various disadvantages and limitations of prior related devices such as have been briefly indicated in the preceding. Further objects of this invention are to provide new and improved collet stops which are relatively easy and inexpensive to construct, which are capable of being easily and conveniently used, and which are capable of giving prolonged service. Another object of this invention is to provide collet stops which can be used with work pieces inserted into a collet to various desired extents.

In accordance with this invention these and various other related objectives of it are achieved by constructing a collet stop so that this device includes an elongated housing having opposed first and second ends. A cavity extends into the housing used with one of these devices from the first end generally towards the second end. A threaded rod is threaded through a bore in the second end of the housing used so as to extend from the exterior of the second end into the cavity towards the first end. Undesired movement of this threaded rod with respect to the housing may be prevented by using a jamb nut on the rod so that the nut fits against the second end.

The housing used in a collet stop as herein described is provided with an exterior tapered, stepped surface adjacent to the first end of the housing. This surface is smallest adjacent to this first end and gradually increases in dimension towards the second end of the housing. It is composed of a plurality of narrow cylindrical sections joined to adjacent sections by what may be termed shoulders. The exterior of the housing is shaped in this manner so that the base of a collet may be secured to this surface to a sufficient extent for operating purposes by being moved over the small end of the surface until it is in contact with the cylindrical section most closely approximating the diameter of such a base. Then the collet and the stop may be pressed together upon this section against the shoulder of its base so as to establish a press fit type of connection.

BRIEF DESCRIPTION OF THE DRAWING

Details of this invention as well as many advantages of it will be apparent from the accompanying drawing, in which.

DESCRIPTION OF THE PREFERRED EMBODIMENT

Figure 1:
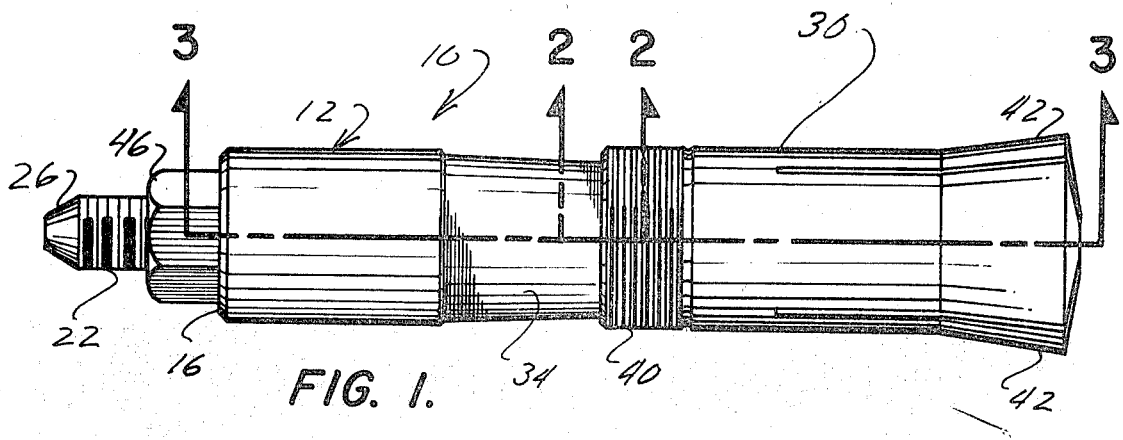
FIG. 1 is a side elevational view of a presently preferred embodiment or form of a collet stop of this invention.
Figure 3:
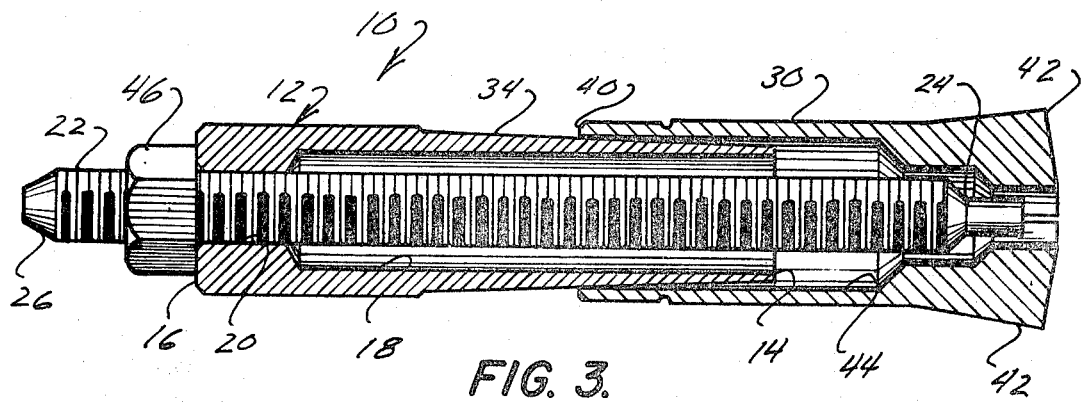
FIG. 3 is a cross-sectional view of the collet stop shown in FIG. 1 taken at line 3–3 in FIG. 1.
Figure 2:
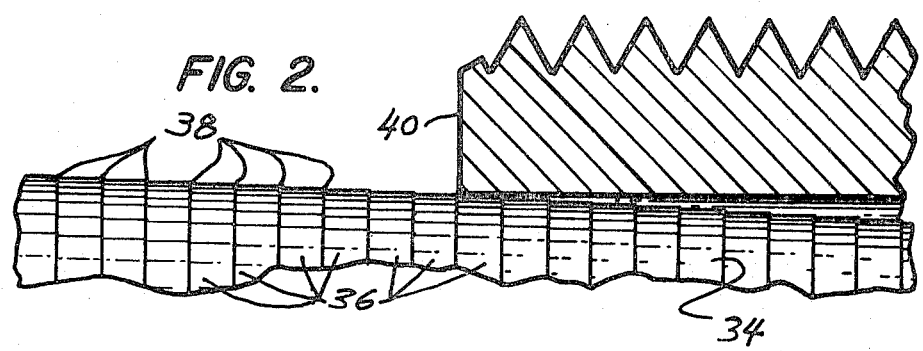
FIG. 2 is an enlarged partial sectional view of a part of this collet stop, this view corresponding to a cross-sectional view taken at line 2–2 of FIG. 1.

In FIG. 1 there is shown a collet stop 10 embodying this invention. This collet stop has an elongated housing 12 of a gun barrellike shape having a first end 14 and a second end 16. A cavity 18 extends into the interior of the housing 12 from this first end 14 almost to the second end 16. A threaded bore 20 is located in the second end 16 in such a manner that its axis coincides with the axis of the cavity 18. A threaded rod 22 is threaded within this bore 20 so as to extend from the exterior of the housing 12 adjacent to the second end 16 in the direction of the first end 14.

In the embodiment of the invention shown this rod 22 is provided with a stop end 24 which is located more or less adjacent to the first end 14 and with a back end 26 located more or less adjacent to the second end 16. The rod 22 may be located with respect to the housing 12 so that this stop end 24 is positioned in any desired position within the housing 12 or so that this stop end 24 projects from the first end 14 as shown. The stop end 24 may be provided with an extension 28 shaped so as to fit in any desired manner within the interior of a collet 30 used with the stop 10. Similarly, the back end 26 may be provided with a tapered shoulder 32 enabling the rod 22 to be engaged with an appropriate tool without damaging the threads on this rod.

The exterior of the housing 12 adjacent to the first end 14 is provided with an elongated tapered, stepped surface 34 which is composed of a plurality of small, relatively narrow cylindrical sections 36 separated from one another by shoulders 38. This surface 34 is of a conical character. If desired, these shoulders 38 may be termed stepped shoulders. These sections 36 gradually increase in diameter away from the first end 14 by uniform sized increments, and each of the sections 36 is only slightly larger than the next smaller section.

The construction of the surface 34 is designed so that a cylindrical base 40 on a collet 30 may be slipped over the first end 14 until it is in contact with the section 36 most closely corresponding in external dimension to the internal dimension of such a base 40. Then a pressed fit type of connection may be established between the collet 30 and the stop 10 by simply tapping on the back end 26 of the rod 22. By virtue of such an operation, the base 40 will fit against the shoulder 38 at one edge of the section 36 upon which it is located. This will mount the collet 30 in such a manner that it is located. This will mount the collet 30 in such a manner that it is in axial alinement with the housing 12 and with the rod 22.

After such a mounting operation, various jaws 42 of the collet 30 will extend generally away from the housing 12 in such a manner that the collet 30 may be used in accordance with conventional practice. Prior to or during such use the rod 22 is moved so that the stop end 24 is located either within the interior of the cavity 44 of the collet 30 or within the interior of the cavity 18 in a desired position so as to serve as a stop. This rod 22 is moved so that the stop end 24 is located either within the interior 44 of the collet 30 or within the interior of the cavity 18 in a desired position so as to serve as a stop. This rod 22 may be held in such a position through the use of jamb nut 46 threaded upon the rod 22 so as to fit against the second end 16 of the housing 12. It will be noted that the stop end 24 shown is shaped so as to fit within the jaws 42 of the collet 30, but that it is capable of being shaped in other manners when it is not to be used so as to extend between these jaws 42.

It is preferred to manufacture the housing 12 out of a material which is to at least a degree softer than the usual material employed in the construction of collets such as the collets 30 so that such collets will not be damaged by the use of the stop 10. Such collets are normally manufactured out of comparatively good grade of steel. In order to prevent damage to them, the housing 12 may be and preferably is manufactured out of aluminum or an aluminum alloy which is softer than steel. It is preferred to locate upon such an aluminum or aluminum alloy housing 12 a conventional relatively hard anodized surface coating serving to minimize scratching and the like.

It will be realized that the collet stop 10 can be used with collets such as a collet 30 having bases such as the base 40 which are either internally or externally threaded without damage to these collets. It will also be realized that the collet stop 10 can be successfully utilized with different sized collets and with collets corresponding to the collet 30 having somewhat imperfectly shaped bases. When used, the collet stop 10 on occasion will provide a safety feature. If undesired axial pressure sufficient to overcome the holding force of the collet is applied to an object such as a work piece held by a collet 30 which is in turn held by the collet stop 10 before damage occurs which is in turn held by the collet stop 10 will be disengaged from the collet 30 allowing axial movement of such an object or work piece.

Because of the nature of this invention, it is to be considered to be limited solely by the appended claims forming a part of this disclosure.

I claim:

1. A collet stop which includes:
an elongated housing having first and second opposed ends, an internal cavity leading from said first end into the interior of said housing towards said second end, an internally threaded bore located within said second end and extending towards said first end, said bore leading through said second end so as to be in communication with the interior of said cavity;
the exterior of said housing adjacent to said first end being a tapered, stepped surface having its smallest end adjacent to said first end, said surface being composed of a plurality of cylindrical sections of different diameters, each of said sections being separated from the next adjacent of said sections by a shoulder; and
threaded rod means threaded within said bore, so as to lead into said housing from said second end of said housing.

2. A collet stop as claimed in claim 1 wherein: said housing is formed of a material which is softer than the material of collet to be used with said collet stop.

3. A collet stop as claimed in claim 1 wherein: said housing is formed of an aluminum composition, and the external surface of said housing is provided with an adherent anodized coating.

4. A collet stop as claimed in claim 1 wherein: the end of said rod closest adjacent to said first end of said housing is shaped so as to fit within the jaws of a collet.

5. A collet stop as claimed in claim 1 including: jamb nut means threaded on said rod so as to fit against said second end of said housing in order to hold said rod in position with respect to said housing.

6. A collet stop as claimed in claim 1 wherein: said housing is of a gun barrellike shape and the axes of said cavity, said surface and said bore are coincident.

7. A collet stop as claimed in claim 1 wherein:
said housing is of a gun barrellike shape and the axes of said cavities, said surface and said bore are coincident;
said housing is formed of an aluminum composition and the external surface of said housing is provided with an adherent anodized coating;
the end of said rod closest adjacent to said first end of said housing is shaped so as to fit within the jaws of a collet; and including: jamb nut means threaded on said rod so as to fit against such said second end of said housing in order to hold said rod in respect to said housing.